(12) United States Patent
Rush et al.

(10) Patent No.: US 8,884,791 B2
(45) Date of Patent: Nov. 11, 2014

(54) KEYPAD SCANNING WITH RADIO EVENT ISOLATION

(75) Inventors: Frederick A. Rush, Austin, TX (US); Lionel M. Cimaz, Pleumeleuc (FR); Wasim Quddus, Austin, TX (US)

(73) Assignee: ST-Ericsson SA, Plan-les-Ouates (CH)

( * ) Notice: Subject to any disclaimer, the term of this patent is extended or adjusted under 35 U.S.C. 154(b) by 3361 days.

(21) Appl. No.: 10/880,239

(22) Filed: Jun. 29, 2004

(65) Prior Publication Data

US 2005/0285449 A1    Dec. 29, 2005

(51) Int. Cl.
| | |
|---|---|
| H03K 17/94 | (2006.01) |
| H03M 11/00 | (2006.01) |
| H04B 1/40 | (2006.01) |
| G06F 1/16 | (2006.01) |
| G06F 3/02 | (2006.01) |
| H04B 15/02 | (2006.01) |

(52) U.S. Cl.
CPC ............... *H04B 1/40* (2013.01); *G06F 1/1613* (2013.01); *G06F 1/1662* (2013.01); *G06F 1/1698* (2013.01); *G06F 3/0202* (2013.01); *G06F 3/0227* (2013.01); *H04B 15/02* (2013.01)
USPC .................................. 341/26; 341/20; 341/22

(58) Field of Classification Search
USPC ............................................... 341/26, 20, 22
See application file for complete search history.

(56) References Cited

U.S. PATENT DOCUMENTS

| | | | | |
|---|---|---|---|---|
| 4,282,422 A | * | 8/1981 | Payne et al. | 219/486 |
| 4,384,361 A | * | 5/1983 | Masaki | 340/7.38 |
| 4,805,165 A | | 2/1989 | Kawamura et al. | 370/84 |
| 4,870,699 A | | 9/1989 | Garner et al. | 455/76 |
| 4,879,758 A | | 11/1989 | DeLuca et al. | 455/296 |
| 4,930,126 A | | 5/1990 | Kazecki et al. | 370/109 |
| 4,996,639 A | * | 2/1991 | Ishimoto et al. | 712/242 |
| 5,031,233 A | | 7/1991 | Ragan | 455/307 |
| 5,058,203 A | * | 10/1991 | Inagami | 455/574 |
| 5,142,699 A | | 8/1992 | Sato et al. | 455/343 |
| 5,150,361 A | | 9/1992 | Wieczorek et al. | 370/95.1 |
| 5,151,769 A | | 9/1992 | Immorlica, Jr. et al. | 357/53 |
| 5,241,541 A | | 8/1993 | Farrell et al. | 970/94.1 |
| 5,280,644 A | * | 1/1994 | Vannatta et al. | 455/265 |
| 5,307,066 A | * | 4/1994 | Kobayashi et al. | 341/155 |
| 5,355,524 A | | 10/1994 | Higgins, Jr. | 455/82 |

(Continued)

FOREIGN PATENT DOCUMENTS

| | | | | |
|---|---|---|---|---|
| EP | 0447302 A1 | 9/1991 | | H04B 1/16 |
| EP | 0447302 B1 | 9/1991 | | H04B 1/16 |

(Continued)

OTHER PUBLICATIONS

U.S. Appl. No. 10/426,042, Sooch et al.

*Primary Examiner* — Hai Phan
*Assistant Examiner* — Amine Benlagsir
(74) *Attorney, Agent, or Firm* — Howison & Arnott, LLP

(57) ABSTRACT

Apparatus and methods for scanning a keypad of a communications device in a manner that tends to minimize interference with transceiver operation, such as a RF transceiver. In one embodiment, a controller receives a periodic signal of the communications device and provides a scan signal to cause the keypad to be scanned. In a sleep mode a keypad scan is performed only subsequent to a keypad activation. However, if the communications device is in use a keypad scan is performed once per frame at predetermined intervals, in one embodiment.

40 Claims, 4 Drawing Sheets

(56) References Cited

U.S. PATENT DOCUMENTS

| | | | |
|---|---|---|---|
| 5,448,755 A | 9/1995 | Tanaka | 455/38.3 |
| 5,450,080 A * | 9/1995 | Irwin | 341/26 |
| 5,471,471 A | 11/1995 | Freeburg et al. | 370/79 |
| 5,471,663 A | 11/1995 | Davis | 455/296 |
| 5,471,741 A * | 12/1995 | Heisner et al. | 29/857 |
| 5,475,684 A | 12/1995 | Shimizu | 370/77 |
| 5,519,711 A | 5/1996 | Sointula | 370/95.3 |
| 5,539,400 A * | 7/1996 | Mears | 341/22 |
| 5,557,079 A * | 9/1996 | Jackson et al. | 200/5 A |
| 5,604,928 A | 2/1997 | Hamano et al. | 455/310 |
| 5,630,224 A | 5/1997 | Swail | 455/296 |
| 5,649,160 A | 7/1997 | Corry et al. | 711/167 |
| 5,758,278 A | 5/1998 | Lansdowne | 455/343.4 |
| 5,764,693 A | 6/1998 | Taylor et al. | 375/222 |
| 5,812,936 A * | 9/1998 | DeMont | 455/63.1 |
| 5,838,741 A | 11/1998 | Callaway, Jr. et al. | 375/346 |
| 5,842,037 A * | 11/1998 | Haartsen | 710/1 |
| 5,872,540 A | 2/1999 | Casabona et al. | 342/362 |
| 5,875,449 A | 2/1999 | Ono | 711/100 |
| 5,917,854 A | 6/1999 | Taylor et al. | 375/222 |
| 5,920,592 A | 7/1999 | Tanaka et al. | 375/220 |
| 5,923,761 A | 7/1999 | Lodenius | 380/49 |
| 5,953,640 A | 9/1999 | Meador et al. | 455/73 |
| 6,020,614 A | 2/2000 | Worley | 257/349 |
| 6,243,597 B1 | 6/2001 | Daanen | 455/574 |
| 6,246,335 B1 | 6/2001 | Tsunoda | 340/825.44 |
| 6,366,622 B1 | 4/2002 | Brown et al. | 375/322 |
| 6,480,553 B1 | 11/2002 | Ho et al. | 375/272 |
| 6,498,819 B1 | 12/2002 | Martin | 375/345 |
| 6,510,185 B2 | 1/2003 | Lee et al. | 375/327 |
| 2002/0080728 A1 | 6/2002 | Sugar et al. | 370/252 |
| 2003/0020521 A1 | 1/2003 | Lee et al. | 327/113 |
| 2004/0064199 A1 * | 4/2004 | Asoh et al. | 700/19 |

FOREIGN PATENT DOCUMENTS

| | | | | |
|---|---|---|---|---|
| EP | 0511511 A2 | 11/1992 | | H04B 1/40 |
| EP | 0511511 A3 | 11/1992 | | H04B 1/40 |
| EP | 0511511 B1 | 11/1992 | | H04B 1/40 |
| EP | 0463621 | 1/2000 | | |

* cited by examiner

KEYPAD SCANNING WITH RADIO EVENT ISOLATION

FIELD OF THE INVENTION

The invention relates generally to the design and operation of communications equipment and, more particularly, to a technique to minimize interference with transceiver operation that may be occasioned when a user device, such as a keypad, is scanned to determine the status of a user input.

BACKGROUND

In many types of mobile communications equipment, including wireless communications equipment such as a cellular telephone, user inputs are entered through the operation of a keypad. The keypad is conventionally constructed in the form of a crosspoint switch, wherein individual keys occupy respective nodes of an array that constitutes the keypad. Information from and to the user is conveyed through the keypad array in the course of keypad scanning procedure. The scanning procedure most frequently incorporates a debounce algorithm that is calculated to validate perceived key activations. The keypad is perhaps the most general user input that is recognized by the communications equipment. (Those skilled in the art will understand that embodiments of the invention are applicable to myriad forms of communications equipment, of which the cellular telephone is but a salient example. Accordingly, the term "equipment" or "communications equipment" is intended here to include not only cellular telephones, but all types of user-operated equipment that comprise a user input device and that operate concurrently with the receiving or transmitting of a signal such as a radio frequency (RF) signal). In general, a keypad scanning procedure requires that outputs from the baseband be passed through the keypad array and subsequently returned to the baseband to determine whether any key has been depressed, or otherwise "selected" by the user.

In the context of an integrated transceiver, such as a single chip communications terminal (i.e., a device that is designed and implemented so that both RF (radio frequency) and baseband functions and circuitry reside on the same integrated circuit (IC)), the suppression of digital switching noise and the minimization of current loops are design aspirations. Conventional keypad scanning techniques distribute current from baseband circuitry to the uncontrolled large area occupied by the keypad array, and then back to the baseband. The activation of such large current loops during the presence of RF activity creates the potential for the keypad activity to interfere with the radio performance. As performed in this manner, keypad scanning is antithetical to the objective of limiting current loops.

Irrespective of the manner in which it is accomplished, the elimination of current loops during intervals when the RF transceiver is in operation (sometimes referred to herein as a "radio event") persists as a prevailing design objective in an integrated transceiver. The digital interference generated by the keypad scanning activity, which will be responsible to power up large areas of a system circuit board, tends to adversely affect the performance of the RF transceiver. Keypad arrays are commonly designed to apply power to all the array outputs until a keypress is detected, in the course of a keyscan process, for example.

Accordingly, there persists a need, particularly in integrated single chip communications terminal architectures, to isolate the keypad scanning procedure from radio events, e.g., during the reception or transmission of an RF signal. In addition, in providing radio event isolation during a keypad scanning procedure, deference must be paid to existing keypad scanning techniques. In particular, it is preferred that enhancements effecting radio event isolation during keypad scanning be downward compatible with equipments that are configured to include separate (i.e., non-integrated) transceiver and baseband blocks. For example, it is desired that keypad debouncing be accomplished in substantially the prevailing manner.

SUMMARY OF THE INVENTION

In one aspect, the invention inheres in a keyscan isolation apparatus includes a keyscan controller to receive to a periodic signal that is provided in a communications device to establish operation of the communications device. The keyscan controller has an output to provide a signal to couple to a keypad interface device to cause a keypad to be scanned.

In another aspect, a method of scanning a keypad for a communications device includes detecting the occurrence of a signal (e.g., a FRM Strobe) that is provided to the communications device to establish an aspect of operation of the device. In response of the occurrence of the signal, a keypad debounce procedure is performed.

In a further aspect, a keyscan isolation apparatus includes a keyscan controller having a first input to couple to a periodic signal that is provided to a communications device to establish operation of the communications device. The keyscan controller has an output to provide a signal to couple to a keypad interface device to cause a keypad to be scanned. The apparatus also includes a counter having an input coupled to a clock signal (CLK), a first output coupled to the keyscan controller to cause the keyscan controller to provide a signal to the keypad interface device, and a second output to couple to the keypad interface device to establish a predetermined condition at an output of the keypad interface device.

In a still further aspect, a storage medium may include instructions to detect the occurrence of a FRM Strobe signal and to perform a keypad debounce procedure within an interval that is short with respect to a period of the FRM Strobe signal.

In yet another aspect, a communications system includes an RF transceiver; a baseband stage coupled to the transceiver; a keypad interface to couple to a keypad to perform a keyscan procedure on a system keypad; and a keyscan isolation device coupled to the baseband stage and to the keypad interface. The keyscan isolation device, in turn, includes a keyscan counter having a clock input to controllably couple to a clock, and a reset input to couple to a system signal that establishes an aspect of the operation of the system. The keyscan isolation device also includes a keyscan controller having an input coupled to a first output of the counter and an output coupled to the keypad interface device to execute a keyscan procedure in response to the counter output.

BRIEF DESCRIPTION OF THE DRAWINGS

The subject keypad scanning technique with radio event isolation may be better understood by, and its many features, advantages and capabilities made apparent to, those skilled in the art with reference to the Drawings that are briefly described immediately below and attached hereto, in the several Figures of which identical reference numerals (if any) refer to identical or similar elements, and wherein.

Figure 1:
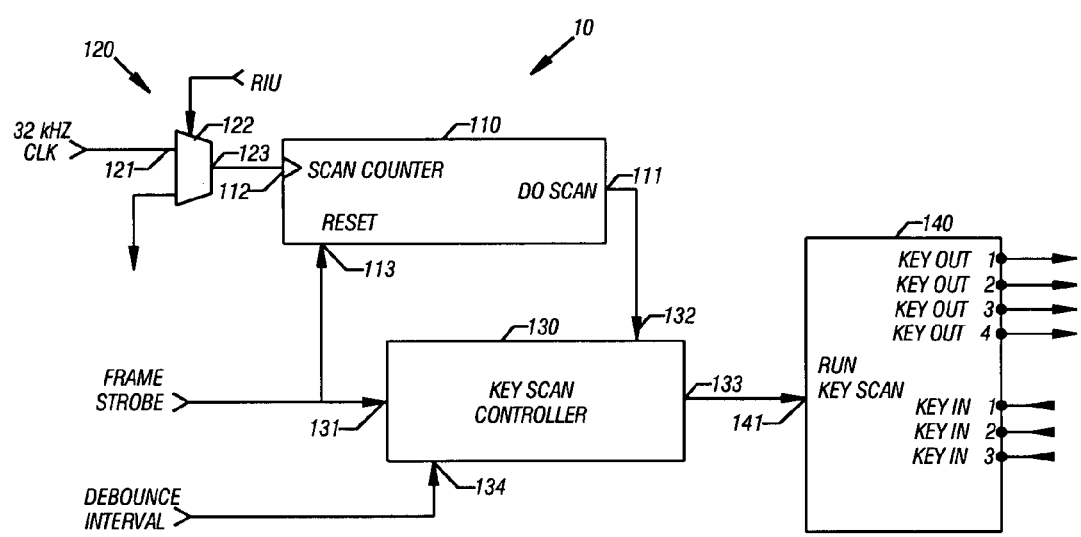
FIG. 1 is a high-level diagram of an embodiment of the invention.

Skilled artisans appreciate that elements in Drawings are illustrated for simplicity and clarity and have not (unless so stated in the Description) necessarily been drawn to scale. For example, the dimensions of some elements in the Drawings may be exaggerated relative to other elements to promote and improve understanding of embodiments of the invention.

DETAILED DESCRIPTION

For a thorough understanding of the subject invention, reference may be had to the following Detailed Description, including the appended Claims, in connection with the above-described drawings. Principally for purposes of precision and concision, embodiments of the invention are described herein in the context of keypad scanning that is performed on a cellular telephone, although the scope of the present invention is not so limited. In particular, for reasons that will become clear below, particular reference is made to the GSM (Global System for Mobile Communications) as exemplary of the numerous types of communication systems with which embodiments are compatible. However, a skilled artisan will understand that the invention is not constrained in its applicability to wireless communications devices generally, much less to compatibility with GSM standards and or protocols.

The subject technique for effecting keypad scanning enables information to be extracted from the keypad of a communications device, such as a cellular telephone, without generation of interference in the course of ongoing radio events. In an embodiment, keypad scanning is performed in response to a system signal that precedes a period during which there may occur no radio events. The embodiment incorporates aspects that simulate the system signal during periods when the communications device is dormant. In an alternative embodiment, keypad scanning is performed in a manner that reduces power consumption attributable to the keypad scanning procedure.

In the use of a cellular telephone, for example, the keypad is regularly monitored to obtain a user input. The user activates a key by the act of depressing a selected key on the keypad. Transmission of information from the keypad uses multiple output and input pins on a keypad interface device. The monitoring operation sequentially monitors the status of individual keys to determine which, if any, of the keys may have been selected. If a key is determined to have been selected, then a circuit connection is made between the keypad interface device input (from the keypad) and the keypad interface device output (to a baseband circuit) in order to register a key activation, as evidenced by the electrical connection of a keyout to a keyin pin of the single chip communications terminal through a switch integrated within the keypad design. The distribution of keypad information creates a relatively large, uncontrolled off-device, circuit path. Because of the physical area encompassed by this circuit path, and because of the transient nature of the signals the circuit path conveys, the distribution of keypad information in this manner gives rise to significant RF noise interference concerns.

Under normal baseband conditions, in response to the identification of keypress event, keypad scanning occurs at a predetermined programmed rate, typically an integer time in milliseconds. The keyscan period is generally accomplished by dividing a real-time baseband clock, which may typically run at 32768 Hz (often referred to herein as a 32 kHz clock, or real-time clock, generally). In this manner, a predetermined scanning period is established. A scanning signal herein referred to as "RunScan" is thereby provided to scan the keypad.

Conventionally, keypad scan is performed completely in the domain of baseband, without regard to any transceiver activity that might then be taking place, generally in a separate, isolated, EMI shielded cavity within the cellular handset. That is, conventionally the keypad scanning procedure is indifferent to a radio event in the form of the reception or transmission of RF signals by the transceiver of the equipment. However, the generation of interfering noise is a concern while the transceiver is in operation, and the keypad scanning circuitry is resident on the same die as the RF transceiver, or within the same EMI shielded cavity as the RF transceiver. Therefore, the large circuit created during the keypad scan, as well as the transient and noisy nature of the scanning signals, is largely incompatible with a low-noise design. Furthermore, the situation is exacerbated by the fact that the design of the keypad interface circuit itself is rarely informed by interference abatement considerations. That is, in most commercially available cellular phone equipment, the keypad interface circuit is generally acquired from an OEM (original equipment manufacturer) who has minimal concern related to noise interference.

One implementation in a device including an RF transceiver and baseband circuits is to interrupt the operation of the clocks and digital switching events while the RF transceiver is in use. In accordance with this principle, all the keypad interface signals are held at a constant state during any RF event. During RF activity, the input and output signals involved in the keypad activity are held at the same potential. The user is expected to press a key while the radio is in use. Since the keypad signals are held at a constant state, any key press that occurs during RF activity does not change the state of the signals on the chip, thus eliminating any interference with the RF activity.

In the conception of embodiments of the invention, an initially appealing approach causes the keypad scan to occur at a fixed point in time in each GSM frame. However, this approach fails in the case of extended dynamic allocation, which, in the manner implemented in GSM, countenances the possible utilization of each slot in the GSM frame. Therefore, there appears to exist no predetermined position in a frame that may, with confidence, be dedicated to a keypad scan procedure. In one embodiment, in order to ensure that a keyscan occurs while the transceiver subsystem is inactive, a periodic GSM frame signal that is used in the baseband for processing events may be used to trigger a keyscan procedure. In particular, consistent with embodiments described herein, a GSM Frame Strobe (FRM Strobe) or another suitable signal precipitates a keyscan procedure.

In the GSM environment, the mobile equipment generates a periodic FRM Strobe signal, approximately every 4.6 ms (milliseconds). In general, in response to a FRM Strobe signal that is received in a given frame, the cellular telephone determines what activity will be undertaken in the course of the next succeeding frame. The FRM Strobe signal is generated when the phone is communicating with a base-station using the RF interface, that is, not in a SLEEP (or dormant) state. However, the timing of the FRM Strobe can be correlated to the period when it is assured that the transceiver subsystem is not engaged in the transmission or reception of an RF signal. Use of the FRM Strobe to trigger a keyscan procedure performs the keyscan procedure while the transceiver is inactive. In systems where no such frame rate signal exists, a periodic signal may be added to the system, in a manner similar to the frame signal previously described, that allows the keyscan procedure to operate at known non-RF (i.e., when the transceiver is inactive) times during the GSM Frame.

In addition, in accordance with an embodiment, the keyscan procedure is performed during intervals in which the equipment is in the SLEEP state. Specifically, it is generally considered unacceptable to stall keypad scanning until the system processor returns from the SLEEP state to access the paging channel, or to perform other system functions, and determine whether a key has been activated, as the SLEEP state can exist for greater than two seconds. However, during the SLEEP state, the FRM Strobe signal is not present. In addition, it may be the case that the only system clock available during SLEEP is the 32 kHz clock or real time clock. But that clock is largely disassociated from the device while the transceiver subsystem is operative. Accordingly, in one embodiment the keypad scanning procedure is not entirely predicated on the availability of the 32 kHz clock or real-time clock.

FIG. 1 is a block diagram of an embodiment that provides an effective keypad scanning technique. In addition, embodiments of the technique are effective to isolate the transceiver subsystem from noise interference that may derive from the scanning procedure. The embodiment of FIG. 1 incorporates, i.e., is responsive to, both the FRM Strobe signal and the 32 kHz clock or real-time clock to synthesize a keypad scanning signal (RunScan) that causes a keyscan procedure to be performed. As will be seen with respect to the embodiment of FIG. 1, a keypad scan procedure will be conducted in response to the FRM Strobe signal when the transceiver is in use. Otherwise, a keypad scan will be initiated in response to the 32 kHz clock or real time clock at periodic intervals that approximate the 4.6 ms FRM Strobe period, through the use of a scan counter.

Figure 2:
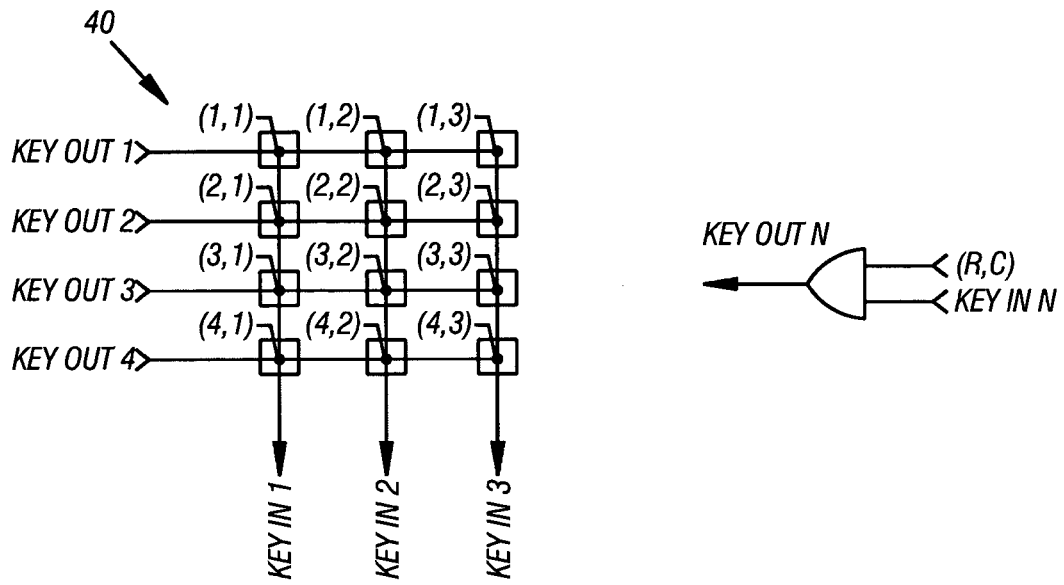
FIG. 2 is a conceptual representation of a keypad array, underscoring the significance of KeyIn and KeyOut signals.

As may be seen in FIG. 1, in one embodiment, a keypad scan technique with radio event isolation comprises a keyscan isolation circuit 10. Keyscan isolation circuit 10, in turn, comprises a keyscan counter 110 coupled to a keyscan controller 130. Keyscan controller 130 operates, in response to a number of inputs and in a manner described below, to provide a desired RunScan input signal to a keypad interface device 140. Keypad interface device 140 manipulates the keypad array (not shown in FIG. 1) through output lines KeyOut1, KeyOut2, KeyOut3, and KeyOut4 and input lines KeyIn1, KeyIn2, and KeyIn3. In this regard, FIG. 2 is provided as a conceptual representation of the operation of keypad interface device 140, at least insofar as its operation is germane to an understanding of embodiments of the invention. In particular, FIG. 2 is helpful in understanding the operation of the KeyOut and KeyIn signals.

Referring now to FIG. 2, as may be seen there, a keypad 40 may be viewed as an array of keys. The array may be arranged in (M×N) rows and columns. In FIG. 2, M=4 and N=3, but, of course, the invention is not so constrained. The signals KeyOut1, KeyOut2, KeyOut3, and KeyOut4 are respectively each coupled to one of the four rows of the keypad array. The KeyIn1, KeyIn2 and KeyIn3 signals are respectively each coupled to one of the three columns. Each node in the keypad array may be correlated to a key that is identified by a coordinate pair, (R,C). For example, in FIG. 2, keypad (3,2) correlates to the key occupying the second column in the third row.

Conceptually, the electromechanical operation of a keypad in the array may be modeled as a dual-input AND gate. One input to the AND gate is provided by one of the four KeyOut lines. The second input corresponds to the state of the keypad that occupies position (M,N). That is, if keypad (3,2) is activated, then the second input to the AND gate at coordinate (3,2) becomes effectively a logic ONE, otherwise, logic ZERO. All of the ANDs may then be ORd together, based on the column arrangement, so that any of the (*,2) ANDs being active, the KeyIn2 signal may be activated, provided that the KeyIn is set to pass this through.

As to operation, in a keypad scanning procedure, the KeyOut lines are successively sequentially asserted (e.g., is caused to assume a value of logic ONE, in some embodiments). As each of those lines is asserted, the status of each of the KeyIn lines is sensed. Therefore, assuming key (3,2) is selected, then when KeyOut3 is asserted by keypad interface device 140, KeyIn2 may assume a logic ONE value. KeyIn1 and KeyIn 3 may remain at logic ZERO. If it is assumed (for pedagogical purposes) that a single keypad may be activated during the course of a single scan, then when KeyOut 4 is asserted (KeyOut 3 having been deasserted), KeyIn may transition from logic ONE to logic ZERO.

Returning now to FIG. 1, as seen there keyscan controller 130 is a component of keyscan isolation apparatus 10. Numerous implementations of keyscan controllers are accessible to persons of ordinary skill in the art. In general, in one embodiment, keyscan controller 130 operates in the nature of a state machine in response to a number of inputs. In one embodiment, the inputs to keyscan controller 130 include a FRM Strobe input 131, a DoScan input 132 from counter 110, and a Debounce Interval input 134. In response to the various inputs (and in a manner that will be revealed below), keyscan controller 110 provides a RunScan output 133 to keypad interface device 140 at an input 141.

Keyscan controller 130 implements an appropriate debounce algorithm in order to reliably and accurately detect keypad activations. When the RF transceiver is in use, keypad controller 130 will receive periodic FRM Strobe signals at input 131. The FRM Strobe signal is present in a number of wireless communication standards and/or protocols. For example, in GSM or GPRS (General Packet Radio Service), the mobile equipment generates a periodic FRM Strobe signal (pulse). The period of the FRM Strobe signal may be, nominally, 4.6 ms. In response, the equipment determines, in general, what activity will be undertaken during the next sequential frame, i.e., during the next 4.6 ms interval. Accordingly, in response to a FRM Strobe signal received in a then-current frame, the equipment determines events that will occur in the next frame. The FRM Strobe signal is present when the equipment is active, i.e., not in a SLEEP mode.

Keyscan controller 130 responds to the FRM Strobe signal as follows. In one embodiment, keyscan controller 130 causes keypad interface device 140 to cycle through all keypad outputs, in the manner described above. If no output presents as activated, then keyscan controller 130 awaits the next FRM Strobe pulse. If, however, a key is activated, then the output is latched and entered into the state machine. The state machine is also advanced to the debouncing state. When the next FRM Strobe signal is received, that key is again sensed. When the key has presented as activated a predetermined number of times, as indicated from the debounce interval delivered to keyscan controller 130 on input 134, the debounce criteria is deemed to have been satisfied, an interrupt is sent to a system processor.

The number of scan iterations to satisfy the debounce criteria is, generally, programmable, and is defined by the debounce interval input 134 to keyscan controller 130. In the example above, two keyscans satisfied the prerequisite. Note, however, that the number of cycles to debounce typically varies among the different types of equipments provided by numerous manufacturers. In addition, the debounce interval input to keyscan controller 130 may also determine whether a keyscan is in fact performed in response to each FRM Strobe signal. With respect to some keypad designs and technologies, it may judicious to perform a keyscan on alternate, for example, FRM Strobe occurrences.

Accordingly, there has been described above a technique to effectively perform keypad scan in a manner that presents minimal, if any, possibility of interference with the RF transceiver subsystem of the equipment. Specifically, keyscan is, in the aspect described above, derived from the FRM Strobe signal, so that a keypad scanning procedure is initiated nearly immediately subsequent to the appearance of a FRM Strobe signal. Because processing associated with the FRM Strobe cannot be coincident with a radio event (e.g., reception or transmission of a RF signal), then controlling keyscan in this manner necessarily isolates the transceiver subsystem from keyscan-related interference. Other times within the GSM/GPRS frame may be equally acceptable for use, however. This time was selected for example purposes, and does not preclude the use of an independent frame rate signal, occurring at a time different from the frame strobe described.

In another aspect, keyscan isolation circuit 10 also comprises a mechanism to enable keyscan to be initiated in the absence of a FRM Strobe signal, as, for example, when the equipment is in a SLEEP mode. Performance of a keyscan procedure in the absence of a FRM Strobe signal is realized through the operation of keyscan counter 110 that, in an embodiment, operates from the 32 kHz clock or real time clock. In general, when keyscan counter 110 reaches a predetermined rollover value, a DoScan pulse is generated at keyscan counter output 111. In one embodiment, the rollover count may be correlated to the 32 kHz clock or real-time clock so the counter period approximates the FRM Strobe period.

The DoScan pulse at output 111 of keyscan counter 110 is coupled to input 132 of keyscan controller 130 to precipitate keypad scanning in the absence of a FRM Strobe signal. During a radio event, the propagation of the 32 KHz signal clock or real-time clock is interrupted so that counter 110 does not advance. With counter operation interrupted, the rollover value will not be reached prior to the arrival of the next FRM Strobe. In order to prevent double scanning the keypad, a FRM Strobe signal is coupled to keyscan counter (Reset) input 113 to also reset the keyscan counter to zero, the value immediately loaded after a scan sequence starts.

As seen in FIG. 1, keyscan counter 110 is driven by the 32 kHz real-time clock. The 32 kHz clock or real-time clock is coupled to a signal input 121 of a clock gate 120. Clock gate 120 is controlled by an RIU (radio in use) signal that is coupled to control input 122 of clock gate 120. That is, when the RF transceiver subsystem of the mobile equipment (e.g., cellular telephone) is not in operation, the RIU signal opens clock gate 120. With clock gate 120 open, the 32768 Hz clock signal (or real-time clock signal) may be coupled from output 123 to signal input 112 of counter 110. Conversely, when the RF transceiver is in operation, clock gate 120 closes in response to the RIU signal and interrupts the propagation of the 32 kHz clock or real-time clock to the counter.

The DoScan output 111 of counter 110 is coupled to input 132 of keyscan controller 130. Consequently, when the value of counter 130 reaches the predetermined rollover count, output 111 is asserted (e.g., assumes a logic ONE) and is coupled to input 132 of keyscan controller. The DoScan pulse from counter 110 triggers state-machine cycling of keyscan controller 130. As indicated above, in one embodiment, the predetermined count is correlated to the 32 kHz clock or real-time clock so that, in the SLEEP mode, the keypad is scanned approximately every 4.6 ms, in a manner that simulates FRM Strobe triggering of the keyscan controller.

The above arrangement conveniently combines two conditions for triggering a keyscan. Both conditions satisfy the desire to remain "quiet" while using the RF transceiver subsystem.

In an alternative embodiment, the salutory features and advantages of a keypad scan technique (as described above) are preserved, and an improvement in power consumption is afforded. As described above with reference to FIG. 1, with the transceiver subsystem not in operation (that is, in the paging mode or the sleep mode), keyscan occurs periodically, every 4.6 ms, for example, regardless of whether there has been a keypad activation. In the embodiment to be described presently, the periodicity of the keypad scan interval is maintained; however, significantly less power is consumed. In essence, while the mobile equipment is in the SLEEP mode, keypad scans are precipitated when a keypad activation is detected. This technique enables the mobile equipment to assert all keypad output lines and to leave the asserted lines in that condition. Power conservation is realized because the output lines are not cycled (asserted and then deasserted) every 4.6 in the course of repeated scans.

Operation in accordance with the alternative embodiment proceeds as follows. While performing radio operations, scanning procedure remains predicated on the FRM Strobe signal. When not utilizing the radio functions, i.e. SLEEP mode, the keyscan counter is allowed to reach the rollover value. At this point, if no key is currently being debounced, the keyscan counter is interrupted. At the same time, all KeyOut lines are asserted so that a subsequent key activation registers a transition high on a respective KeyIn line. For reference, the condition in which the keyscan counter is stopped and KeyOut lines are asserted may be referred to as the wait for press (WFP) state.

While in the WFP state, one of two events may follow that will bring the keypad block out of the WFP state. The first is to have a key activated. This is easily detected by using an "OR" gate on the KeyIn lines returning from the keypad array. If a keypress is detected in this manner, by the "OR" gate going high, the state of the keypad block will be transitioned to a RunScan state, in the manner described above. Should a scan be performed and no key present as selected, then following a second interval without a scan detecting a key, present as selected then the keyscan counter is interrupted and all KeyOut lines are again asserted.

A second event that operates to lower the outputs may be the resumption of radio activity, typically the page operation. Because monitoring the paging channel causes the frame structure to restart, the FRM Strobe signal may be used to reset the counter. The KeyOut lines will be deasserted whenever the counter is not at its rollover value. Thus there may be provided a convenient method of turning off the asserted outputs, without manipulation of the keypad scan block. Once the paging interval has passed, the counter will again count up to the rollover value. Upon reaching the rollover value, and not currently debouncing a keypress, the counter will saturate and cause all the keyscan outputs to again be asserted.

Figure 3:
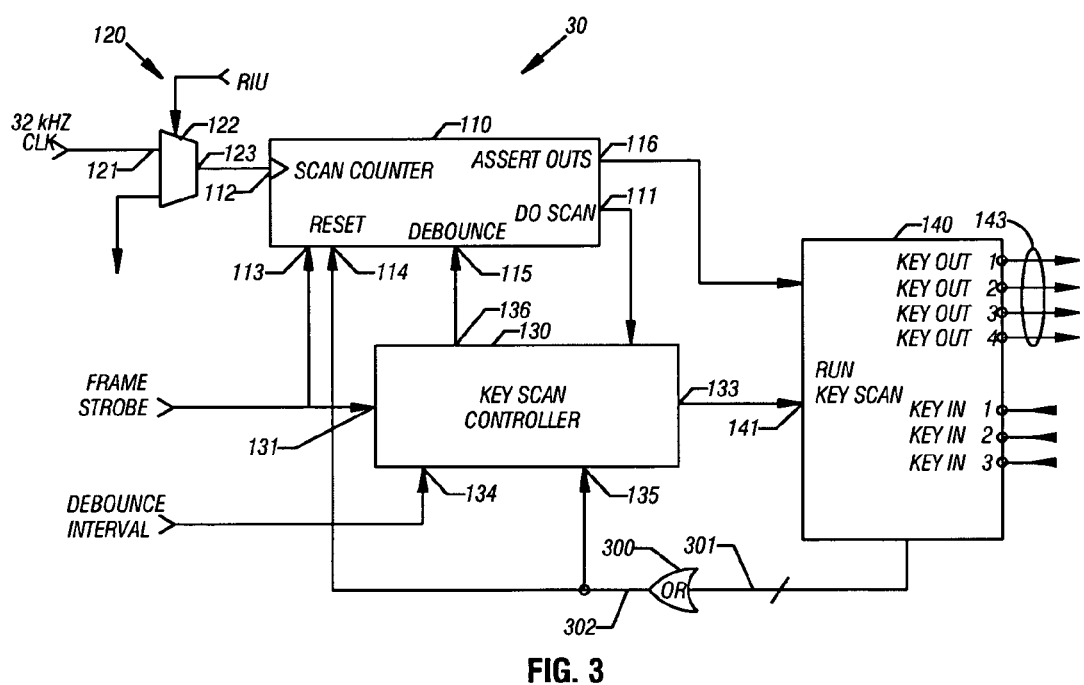
FIG. 3 is a high-level diagram in accordance with an embodiment of the invention in which keypad scanning is achieved with a reduction in power consumption.

FIG. 3 presents a circuit of an exemplary embodiment of a circuit structure to implement the keypad scanning technique described immediately above.

Referring now to FIG. 3, depicted therein is a keypad isolation apparatus 30 that represents an alternative to the embodiment depicted in FIG. 1, for example. As indicated above, the keyscan isolation apparatus of FIG. 3 retains the advantages of the embodiment of FIG. 1, and affords additional advantages with respect to power consumption.

Referring now to FIG. 3, it may be seen there that keyscan isolation apparatus 30 comprises a keyscan counter 110, coupled through CLK gate 120 to the 32 kHz clock or real-time clock, keyscan controller 130, and keypad interface device 140, all arranged largely as shown in FIG. 1 and described above.

In addition, keypad isolation apparatus 30 comprises a logic function 300 coupled between keypad interface 140 and keyscan controller 130. Specifically, in one embodiment, logic function 300 comprises an "OR" gate having multiple inputs, 301a, 301b, . . . , 301n (not shown in FIG. 3), coupled to respective inputs from the device keypad. The output 302 of OR gate 300 is coupled to input 135 of the keyscan controller and to input 114 of keyscan counter 110.

Note that for purposes of this Detailed Description, OR gate 300 is to be understood as a pedagogical construct. That is, depending on the total number of keypads included in the communications device, OR gate 300 may, in fact, be implemented by one or more individual OR gates, each of which has a number of inputs coupled to respective ones of the keypad outputs. In such an arrangement, the outputs of the individual gates are then combined (logically and/or physically) to provide the desired output signal. Further, for purpose of this Description, OR gate 300 is to be construed as any mechanism that implements the desired logic function: activation of any keypad function results in a defined logical input (logic ONE, for example) to input 135 of keyscan controller 130. Output 302 of OR-gate 300 is also coupled to input 114 of counter 110.

As to operation of the keyscan isolation apparatus embodied in FIG. 3, in the absence of a FRM Strobe signal, the output of the 32 kHz CLK or real-time clock will be passed to input 112 of counter 110 so that counter 110 will count toward a predetermined rollover value, which in practice closely approximates the frame strobe period. Output 136 from keyscan controller 130 is coupled to input 115 of counter 110 to inform counter 110 whether a debounce procedure is then in process. If not, counter 110 will allow its counter to be halted. That is, if keyscan counter achieves the rollover count with no ongoing debounce procedure, counting will be halted. In addition, coincident with the halting of keyscan counter 110, a counter output 116 will provide an AssertOuts signal to keypad interface device 140. The AssertOuts output causes all the KeyOut lines of device 140 to be asserted. The state in which the counter is halted and all keypad KeyOut lines are asserted may be referred to as a WFP (wait-for-press) state.

If, during the WFP state, output 143 becomes asserted (suggesting a keypad activation), then counter 110 will again begin to count. When the counter reaches the rollover value, output 111 will cause keypad controller 130 to initiate a debounce procedure such as has been described above. If the apparent keypad activation is not validated in the course of the debounce procedure, keypad isolation apparatus 30 will return to the WFP state.

Figure 4:
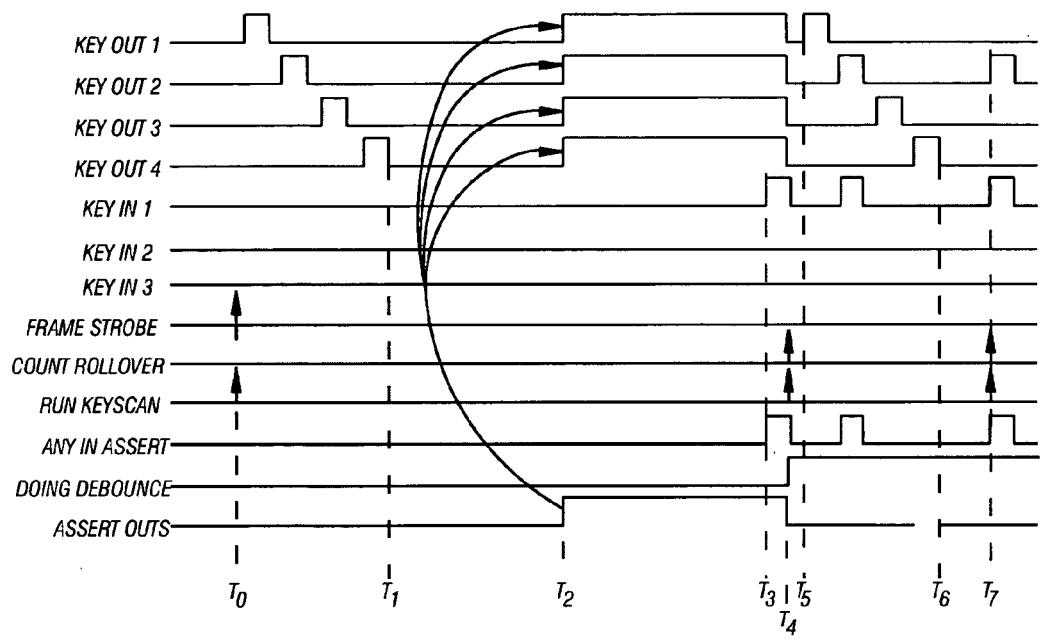
FIG. 4 is a timing diagram that illustrates the relationships among various significant waveforms that are encountered in a hypothetical keypad scanning procedure.

Subsequently, if operation of the RF transceiver subsystem is resumed (as indicated by the reception of a FRM Strobe signal, for example), then keyscan counter 110 will reset as a result of the applicaiton of FRM Strobe signal to counter input 113. In addition, resetting counter 110 will deassert output 116 from the scan counter 110, which in turn will cause the KeyOut lines of keypad interface device 140 to again become deasserted. That is, by the above-described approach the keypad outputs may be conveniently deasserted in order to restart RF operations, without specific direct manipulation of keypad interface device 140. At such time as the RF transceiver subsystem again becomes inactive (i.e., FRM Strobe goes away), counter 110 will continue to count toward the rollover value. If keyscan controller 130 is not in the course of a debounce procedure when scan counter 110 reaches rollover, counter output 116 will go high, thereby causing the KeyOut lines of keypad interface device 140 to become asserted. FIG. 4 is a timing diagram that graphically illustrates the significant signal relationships encountered in the procedure narrated above.

Referring now to timing diagram FIG. 4, at $T_0$ a FRM Strobe signal is shown to occur. In fact, in FIG. 4, FRM Strobe may be taken to represent the final FRM Strobe that is received immediately prior to a SLEEP interval. As indicated above, the occurrence of FRM Strobe means that the transceiver subsystem is not in use (i.e., either receiving or transmitting a signal). Accordingly, a keyscan procedure will be performed immediately subsequent to FRM Strobe. Keyscan controller outputs a RunScan pulse to keypad interface device 140. During the interval between $T_0$ and $T_1$, the keyout lines (KeyOut1, KeyOut 2, KeyOut 3, and KeyOut 4) are successively momentarily asserted. Because, in FIG. 4 no keys have been activated, during $T_0$-$T_1$ none of the KeyIn lines (KeyIn 1, KeyIn 2, and KeyIn 3) are asserted. Similarly, AnyIn Assert remains deasserted during the ($T_0$-$T_1$) interval. In one embodiment, ($T_0$-$T_1$) may subsume nine periods of the 32 kHz clock (or real-time clock), that is, approximately 280 microseconds.

At time $T_2$, the counter reaches the rollover count because there has occurred no intervening FRM Strobe signal to reset counter 110. (Recall, saturation is rollover, in the absence of an ongoing debounce procedure.) Consequently, at $T_2$ AssertOuts is asserted, as are KeyOut 1, KeyOut 2, KeyOut 3, and KeyOut 4. (Recall that power is conserved by maintaining an assertion of all KeyOut lines as opposed to sequentially, and repeatedly, asserting and deasserting those lines.)

At $T_3$, KeyIn1 has been activated. Therefore, AnyIn Assert is asserted, due to the logic OR function. This, in turn causes the counter to rollover and to generate a RunKeyScan output, simultaneously. Here, a debounce process, such as has been described above, is initiated, as signified by the assertion of DoingDebounce. Therefore, a keypad scan sequence is initiated at $T_5$ and is completed at $T_6$. During that sequence, KeyIn1 presents as asserted. In the next counter-based keyscan interval, beginning at $T_7$, KeyOut 2 is pulsed, and KeyIn1 again presents as asserted.

Persons of ordinary skill in the art will appreciate that the keyscan isolation apparatus described herein may be implemented in numerous ways, all within the ken of such persons. For example, the available techniques include implementation in the form of combinational or sequential logic, state machines, and ROM (read only memory), to name but a few. Furthermore, the scope of the invention admits of implementation, in whole or in part, by virtue of software programming.

In that regard, it is recognized that embodiments may be realized in software (or in the combination of software and hardware) that may be executed on a host system, such as, for example, a computer system, a processor, a wireless device, or the like. Accordingly, such embodiments may comprise an article in the form of a machine-readable storage medium onto which there are written instructions, data, etc. that constitute a software program that defines at least an aspect of the operation of the system. The storage medium may include, but is not limited to, any type of disk, including floppy disks, optical disks, compact disk read-only memories (CD-ROMs), compact disk rewritables (CD-RWs), and magneto-optical disks, and may include semiconductor devices such as read-only memories (ROMs), random access memories (RAMs), erasable programmable read-only memories (EPROMs), electrically erasable programmable read-only memories (EEPROMs), flash memories, magnetic or optical cards, or any type of media suitable for storing electronic instructions. Similarly, embodiments may be implemented as software modules executed by a programmable control device, such as a computer processor or a custom designed state machine.

Figure 5:
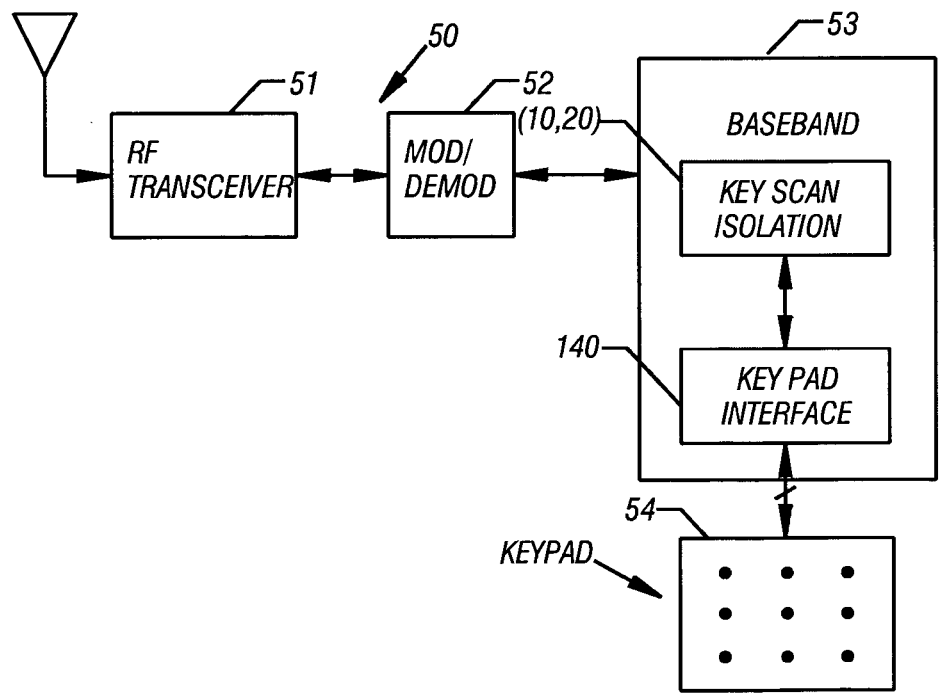
FIG. 5 is a high-level diagram of a transceiver system in accordance with an embodiment of the invention.

The subject keyscan isolation technique is attractive in numerous applications. For example, the apparatus may be used with salutary effect in a system such as depicted in FIG. 5. The receiving system of FIG. 5 may be representative in its salient aspects of a radio system such as a cellular telephone or other wireless device such as a personal digital assistant (PDA), messaging system, and the like.

As illustrated in FIG. 5, system 50 comprises a transceiver subsystem 51 that may be coupled, through a duplexer, for example, to a system antenna. Transceiver system 51 is coupled to a modulator/demodulator 52, which is, in turn, coupled to a baseband stage or circuitry 53. In one embodiment, baseband stage 53 may be coupled to a keypad 54 through a keyscan isolation apparatus (10, 20) that is configured in accordance with embodiments disclosed herein. Alternatively, baseband circuitry or stage 53 may be deemed to itself comprise the keyscan isolation apparatus. Keyscan isolation apparatus may conform to the embodiments described above and illustrated in FIG. 1 or FIG. 3. In an embodiment, and irrespective of which keyscan isolation apparatus is incorporated, the keyscan isolation apparatus may be coupled to a keypad through a keypad interface device 140, such as is illustrated in FIG. 1 and FIG. 3.

The disclosed inventive concepts provide many advantages. The invention prevents keypresses from interfering with radio events, such as transmissions and receptions. It also intrinsically provides for a regular debounce interval, even in the presence of changing radio events. The change from conventional baseband keypad scanners are to light the scan lines when it is known that the radio will not be used, debounce based on the frame rate, and efficiently switching between radio use and sleep modes, without impacting the scanning method. When switching between frame mode of operation and sleep mode, the scanning methods are not changed, as the sleep mode debouncing is performed using the same time interval as the frame rate.

To save power, the scanning engine provides an all stop operation, where the outputs for all keyscan lines are asserted, and the periodic scanning is halted until a keypress is detected or frame mode is restarted. These transitions are seamless to the scan interval, and the scan engine always operates on a single clock to ease timing closure of the design. This automatic change of scan method may ensure that the keyscan outputs are not asserted while using the radio, and limits the intervention of the local processor to make the keyscan safe for radio use.

The item for the change between the intrinsic scan and the radio isolation scan is based on the frame rate generation of a scan signal to the keypad scanner. In the absence of this signal, the intrinsic counter based scan is performed, or with the lack of a detected keypress, the low power mode is entered. The pressing of a key or the assertion of the frame signal will transition back from the low power mode into the intrinsic or frame signal driven scanning. There is no concern that an intrinsic scan will occur during frame operations, as the counter that generates the intrinsic scan is disabled while the radio is in use, and the frame rate signal occurs more frequently than the now extended due to loss of clock scan interval that the intrinsic counter would provide.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A keyscan apparatus comprising:
   a keyscan controller coupled to receive a periodic signal that is provided to a communications device to establish operation of the communications device, the keyscan controller having an output to provide a scan signal to couple to a keypad interface device to cause a keypad to be scanned;
   a counter having a first output and a second output;
   a keypad activation logic;
   wherein in the absence of the periodic signal, the counter operates in response to the output of the keypad activation logic to provide a signal at the counter first output that causes the keyscan controller to provide the scan signal;
   wherein in the absence of the periodic signal, the counter operates to provide a signal at the second counter output that causes the output of the keypad interface device to assume a predetermined condition; and
   wherein the keyscan controller is operative to interrupt a system processor if in the course of a debounce procedure subsequent to the provision of the scan signal, and in response a key is determined to be activated.

2. A keyscan apparatus as defined in claim 1, wherein the periodic signal is a frame rate strobe signal.

3. A keyscan apparatus as defined in claim 1, further comprising:
   means coupled to the keyscan controller for causing the keyscan controller to provide the scan signal in the absence of the periodic signal.

4. A keyscan apparatus as defined in claim 3, wherein the means comprises the counter having an input to be gated to selectively couple to a clock and having the first output coupled to the keyscan controller.

5. A keyscan apparatus as defined in claim 1, further comprising: the counter having a clock input to couple to a clock signal, a reset input coupled to receive the periodic signal, and the first output coupled to the keyscan controller.

6. A keyscan apparatus as defined in claim 5, further comprising: a gate having a signal input to couple to a clock, a control input to couple to a status signal, and an output coupled to the clock input of the counter.

7. A keyscan apparatus as defined in claim 6, wherein the first output counter is a control signal to the keyscan controller in the absence of the periodic signal.

8. A keyscan apparatus as defined in claim 7, wherein the control signal is related to a predetermined rollover count that is established in the counter.

9. A keyscan apparatus as defined in claim 8, wherein the keyscan controller has an input to couple to a debounce interval signal.

10. A keyscan apparatus as defined in claim 7, wherein the control signal is related to a programmable rollover.

11. A method of scanning a keypad of a communications device, the method comprising:
- detecting the occurrence of a periodic signal that is generated by the communications device to establish an aspect of operation of the device; and
- performing a keyscan procedure in response to the occurrence of the periodic signal;
- wherein a counter is coupled with a keyscan controller and a keypad activation logic;
- wherein the counter having a first output and a second ouput;
- wherein in the absence of the periodic signal, the counter operates in response to the output of the keypad activation logic to provide a signal at the counter first output that causes the keyscan controller to provide a scan signal during the keyscan procedure;
- wherein in the absence of the periodic signal, the counter operates to provide a signal at the second counter output that causes the output of a keypad interface device to assume a predetermined condition; and
- wherein the keyscan controller is operative to interrupt a system processor if in the course of a debounce procedure performed subsequent to the provision of the keyscan procedure, and in response a key is determined to be activated.

12. A method as defined in claim 11, wherein the periodic signal is a frame rate strobe signal that indicates non-operating times of a transceiver subsystem.

13. A method as defined in claim 11, wherein the keyscan procedure is performed during processing of the periodic signal by the communications device.

14. A method as defied in claim 13, wherein a keypad debounce procedure is performed substantially immediately subsequent to the occurrence of the periodic signal.

15. A method as defined in claim 11, further comprising: performing an alternative keyscan procedure in the absence of the periodic signal.

16. A method as defined in claim 15, wherein the periodic signal is a frame rate strobe signal that indicates operation of a transceiver subsystem.

17. A method as defined in claim 15, wherein the keyscan procedure is performed following an alternate control pulse.

18. A method as defied in claim 17, wherein a keypad debounce procedure is performed substantially immediately subsequent to the occurrence of the alternate control pulse.

19. A method as defined in claim 15, wherein the alternative keyscan procedure is performed periodically.

20. A method as defined in claim 19, further comprising: coupling a clock signal to an input of the counter; coupling the first output counter to the keyscan controller; and coupling an output of the keyscan controller to the keypad interface device.

21. A method as defined in claim 20, further comprising: gating the clock signal to the counter input.

22. A method as defined in claim 20, wherein the clock signal is gated by a signal indicative of the state of an RF subsystem of the communications device.

23. A method as defined in claim 22, wherein the clock is gated by a signal indicative of whether a transceiver of the communications device is operating.

24. A method as defined in claim 21, wherein the second output counter is a rollover indication.

25. A method as defined in claim 21, wherein the keyscan procedure is originated by a strobe located within a frame having the same periodicity as the frame rate strobe signal.

26. A keyscan apparatus comprising:
- a keyscan controller coupled to receive a periodic signal that is provided by a communications device to establish operation of the communications device and having an output to provide a scan signal to couple to a keypad interface device to cause a keypad to be scanned; and
- a counter having an input coupled to receive a clock signal, a first output and a second output;
- a keypad activation logic;
- wherein in the absence of the periodic signal, the counter operates in response to the output of the keypad activation logic to provide a signal at the counter first output that causes the keyscan controller to provide a scan signal;
- wherein in the absence of the periodic signal, the counter operates to provide a signal at the second counter output that causes the output of the keypad interface device to assume a predetermined condition; and
- wherein the keyscan controller is operative to interrupt a system processor if in the course of a debounce procedure performed subsequent to the provision of the scan signal, and in response a key is determined to be activated.

27. The keyscan apparatus defined in claim 26, wherein the periodic signal is a frame rate strobe signal.

28. The keyscan apparatus defined in claim 26, further comprising: the keypad activation logic having an input to couple to a keypad input of the keypad interface device and the output coupled to the counter and to the keyscan controller to cause the scan signal to be provided to the keypad interface device in response to a key activation.

29. The keyscan apparatus defined in claim 28, wherein the first counter output is a rollover output that corresponds to a predetermined counter value.

30. The keyscan apparatus defined in claim 26, wherein the first counter output is a rollover that corresponds to a predetermined or programmed counter value.

31. The keyscan apparatus defined in claim 26, wherein the second counter output causes the output of the keypad interface device to be asserted.

32. An article comprising a non-transitory machine-accessible storage medium comprising instructions that, if executed, enable a system to:
- detect the occurrence of a frame rate strobe signal;
- perform a keyscan procedure in response to the occurrence of the frame rate strobe signal; and
- perform a keypad debounce procedure within an interval that is relatively short with respect to a period of the frame rate strobe signal;
- wherein a counter is coupled with a keyscan controller and a keypad activation logic;
- wherein the counter having a first output and a second ouput;
- wherein in the absence of the frame rate strobe signal, the counter operates in response to the output of the keypad activation logic to provide a signal at the counter first output that causes the keyscan controller to provide a scan signal;
- wherein in the absence of the frame rate strobe signal, the counter operates to provide a signal at the second counter output that causes the output of a keypad interface device to assume a predetermined condition; and
- wherein the keyscan controller is operative to interrupt a system processor if in the course of a debounce procedure performed subsequent to the provision of the scan signal, and in response a key is determined to be activated.

33. An article as defined in claim 32, further comprising instructions that, if executed, enable the system to: perform an alternative debounce procedure in the absence of the frame rate strobe signal.

34. An article as defined in claim 33, further comprising instructions that, if executed, enable the system to: assert outputs of the keypad interface device in the absence of the frame rate strobe signal.

35. An article as defined in claim 34, further comprising instructions that, if executed, enable the system to: establish a state of the system during which the outputs of the keypad interface device are asserted.

36. An article as defined in claim 35, further comprising instructions that, if executed, enable the system to: detect a key activation that occurs during the state.

37. A system comprising:
a transceiver;
a baseband stage coupled to the transceiver;
a keypad interface device to couple to a keypad to perform a keyscan procedure on the keypad; and
a keyscan isolation device coupled to the keypad interface, the keyscan isolation device comprising:
a keyscan counter having a clock input to controllably couple to a clock, and a reset input to couple to a system signal that establishes an aspect of the operation of the system; and
a keyscan controller having an input coupled to a first output of the counter and an output coupled to the keypad interface device to execute the keyscan procedure in response to the first counter output in the absence of the system signal;
wherein the keyscan counter has a second output to couple to the keypad interface device to cause an output of the keypad interface device to be asserted in the absence of the system signal; and
wherein the keyscan controller is operative to interrupt a system processor if in the course of a debounce procedure performed subsequent to the keyscan procedure, and in response a key is determined to be activated.

38. A system as defined in claim 37, further comprising: keypad activation logic circuitry, having an input to couple to a keypad input of the keypad interface device and an output coupled to the keyscan counter and to the keyscan controller to cause a scan signal to be provided to the keypad interface device in response to a keypad activation.

39. A system as defined in claim 37, further comprising: a clock gate having an input to couple to the clock, and an output coupled to the clock input of the keyscan counter, the clock gate operable to controllably couple the clock to the keyscan counter in response to a signal corresponding to an operating state of the system.

40. A system as defined in claim 37, wherein the second output of the keyscan counter to cause an output of the keypad interface device to detect the keypad activation in the absence of the system signal.

* * * * *